US 8,010,729 B2

(12) United States Patent
Gyobu (10) Patent No.: US 8,010,729 B2
(45) Date of Patent: Aug. 30, 2011

(54) IMAGE PROCESSING CONTROLLER AND IMAGE PROCESSING DEVICE

(75) Inventor: Yoshikazu Gyobu, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 206 days.

(21) Appl. No.: 12/078,850

(22) Filed: Apr. 7, 2008

(65) Prior Publication Data
US 2008/0256285 A1 Oct. 16, 2008

(30) Foreign Application Priority Data

Apr. 10, 2007 (JP) ................. 2007-102773
May 25, 2007 (JP) ................. 2007-139577
Feb. 21, 2008 (JP) ................. 2008-040259

(51) Int. Cl.
*G06F 13/36* (2006.01)
*G06F 13/20* (2006.01)
*G06F 15/16* (2006.01)
*G06F 13/14* (2006.01)

(52) U.S. Cl. ........ 710/306; 710/310; 710/313; 710/315; 345/502; 345/520

(58) Field of Classification Search .......... 710/300, 710/105–106, 305–306, 310–311, 313, 315, 710/52, 72; 345/502, 503, 520, 522
See application file for complete search history.

(56) References Cited

U.S. PATENT DOCUMENTS

| 2004/0181617 | A1* | 9/2004 | Sauber ............................. 710/20 |
| 2004/0230717 | A1* | 11/2004 | Funatsu et al. ................. 710/22 |
| 2006/0123177 | A1* | 6/2006 | Chan et al. ..................... 710/306 |
| 2006/0184809 | A1* | 8/2006 | Kojou et al. ................... 713/300 |
| 2006/0190663 | A1* | 8/2006 | Lu ................................. 710/312 |
| 2007/0067517 | A1* | 3/2007 | Kuo ............................... 710/100 |
| 2007/0139422 | A1* | 6/2007 | Kong et al. .................... 345/502 |
| 2008/0013785 | A1 | 1/2008 | Gyobu |

FOREIGN PATENT DOCUMENTS
JP 3682443 5/2005

OTHER PUBLICATIONS

"PCI Express to PCI/PCI-X Bridge Specification". Revision 1.0. Jul. 14, 2003. PCI-SIG. pp. 1-69, 131-134, and 169-174.*
"The Free On-Line Dictionary of Computing". Entry 'first-in first-out'. Online Dec. 6, 1999. Retrieved from Internet Dec. 22, 2009. <http://foldoc.org/fifo>.*
"The Free On-Line Dictionary of Computing". Entry 'Accelerated Graphics Port'. Online Jul. 19, 2004. Retrieved from Internet Jun. 3, 2010. <http://foldoc.org/agp>.*
Abstract of JP 2003-333232 published Nov. 21, 2003.

* cited by examiner

*Primary Examiner* — Thomas J Cleary
(74) *Attorney, Agent, or Firm* — Harness, Dickey & Pierce, P.L.C.

(57) ABSTRACT

A first interface receives image information and an output destination address from a first external device. A second interface transmits image information to a second external device at a lower communication speed than the first interface. A communication path connects the first interface and the second interface to exchange data, on which a first-in first-out memory is provided. Upon the first interface receiving the address, when the second interface is specified as a transmission destination based on the address, a transmitting unit transmits the image information to the second interface through the communication path and the first-in first-out memory.

17 Claims, 10 Drawing Sheets

IMAGE PROCESSING CONTROLLER AND IMAGE PROCESSING DEVICE

CROSS-REFERENCE TO RELATED APPLICATIONS

The present application claims priority to and incorporates by reference the entire contents of Japanese priority documents, 2007-102773 filed in Japan on Apr. 10, 2007, 2007-139577 filed in Japan on May 25, 2007, 2008-040259 filed in Japan on Feb. 21, 2008.

BACKGROUND OF THE INVENTION

1. Field of the Invention

The present invention relates to an image processing controller that includes a plurality of interfaces having different specifications and an image processing device.

2. Description of the Related Art

Conventional image forming apparatuses transfer image data through an engine interface (I/F), mounted on an image processing controller, which is a comparatively low-speed interface such as Peripheral Component Interconnect (PCI). If the PCI is used as an interface between the image processing controller and a chipset of a central processing unit (CPU) in the image forming apparatus, the capacity of the PCI is insufficient to transfer data. Therefore, Accelerated Graphics Port (AGP) is conventionally used. The AGP is an interface specification for a data transfer path between a video card and a main memory, developed by Intel Corporation.

As explained above, a plurality of interfaces such as PCI and AGP are often used for the image forming apparatus. Therefore, a technology for switching the interfaces is proposed as disclosed in Japanese Patent Application Laid-open No. 2003-333232. By using the technology, high-speed transfer becomes possible in a communication path through which a large amount of data is transferred.

Recently, PCI Express (hereinafter, "PCIe") has been proposed in the computer industry. The PCIe is an interface specification for data transfer at a higher speed than that of the PCI, and is compatible with the PCI at software level.

On the other hand, a request to mount-the high-speed engine I/F such as the PCIe also on an image processing controller tends to be made to improve throughput of data communication.

Moreover, even if a PCIe I/F is mounted on the image processing controller of the image forming apparatus, a PCI I/F is also required depending on a device to be mounted on the image forming apparatus.

The PCIe is capable of data transfer at a higher speed than that of the AGP. Therefore, when the PCIe I/F is mounted on the image processing controller, the AGP can be replaced with the PCIe. This allows the interfaces to be unified so as to be compatible with PCI at software level.

However, in the technology described in Japanese Patent Application Laid-open No. 2003-333232, it is not considered that the interfaces are unified so as to be compatible with the PCI or the PCIe at the software level.

Furthermore, when the PCI and the PCIe are mounted on the image forming apparatus in a simple manner, that is, when only the PCI and the PCIe are mounted thereon, a component such as a switch or a bridge is required to convert data between the PCI and the PCIe, which causes an increase in cost thereof.

SUMMARY OF THE INVENTION

It is an object of the present invention to at least partially solve the problems in the conventional technology.

According to an aspect of the present invention, there is provided an image processing controller including a first interface that receives image information and an address indicating an output destination of the image information from a first external device; a second interface that transmits image information to a second external device at a communication speed lower than that of the first interface; a communication path that connects the first interface and the second interface to exchange data; a first-in first-out memory provided on the communication path; a third interface that transmits image information to a third external device; a specifying unit that specifies, upon the first interface receiving the address, either one of the second interface and the third interface as a transmission destination of the image information received by the first interface based on the address; and a transmitting unit that transmits, when the second interface is specified as the transmission destination, the image information to the second interface through the communication path and the first-in first-out memory.

Furthermore, according to another aspect of the present invention, there is provided an image processing device including an image processing engine that performs an image processing; an image processing unit that has image processing capability lower than that of the image processing engine; an image storage unit that stores therein image data; and an image processing controller that includes a first interface that receives image information and an address indicating an output destination of the image information from a first external device, a second interface that transmits image information to a second external device at a communication speed lower than that of the first interface, a communication path that connects the first interface and the second interface to exchange data, a first-in first-out memory provided on the communication path, a third interface that transmits image information to a third external device, a specifying unit that specifies, upon the first interface receiving the address, either one of the second interface and the third interface as a transmission destination of the image information received by the first interface based on the address, and a transmitting unit that transmits, when the second interface is specified as the transmission destination, the image information to the second interface through the communication path and the first-in first-out memory.

Moreover, according to still another aspect of the present invention, there is provided an image processing method including first interfacing including receiving image information and an address indicating an output destination of the image information from a first external device; second interfacing including transmitting image information to a second external device at a communication speed lower than that of the first interfacing; connecting the first interfacing and the second interfacing to exchange data through a communication path on which a first-in first-out memory is provided; third interfacing including transmitting image information to a third external device; specifying, upon receiving the address, either one of the second interfacing and the third interfacing as a transmission destination of the image information received at the first interfacing based on the address; and transmitting, when the second interfacing is specified as the transmission destination, the image information to the second interfacing through the communication path and the first-in first-out memory.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. It is noted that the following embodiments are not limited to a case where an image processing controller is mounted on an image forming apparatus, and thus the image processing controller can be mounted on various devices that perform image processing.

Figure 1:
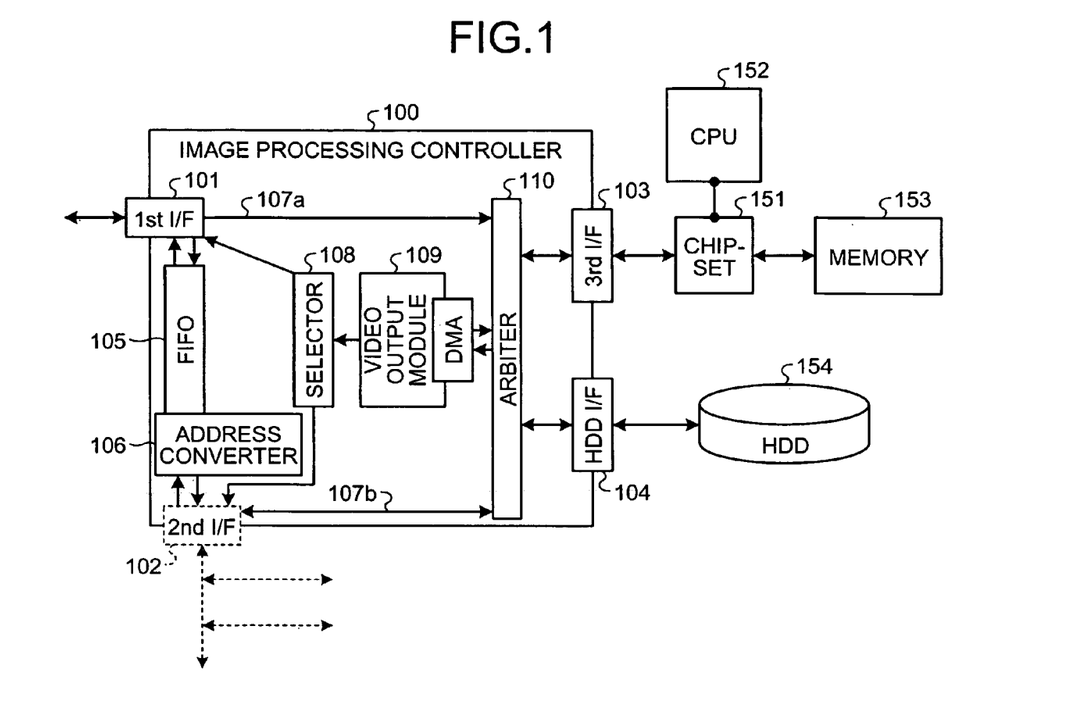
FIG. 1 is a schematic block diagram of an image processing controller according to a first embodiment and its peripheral devices.

FIG. 1 is a schematic block diagram of an image processing controller according to a first embodiment and its peripheral devices. An image processing controller 100 includes a first interface (I/F) 101 connected to an engine including scanner/plotter, a second interface 102 connected to option devices in addition to other engine and image processing controller as option, a third interface 103 connected to a memory, and an interface connected to a hard disk drive (HDD) in an HDD I/F module 104 (or HDD I/F 104). In the image processing controller 100, the first I/F 101 and the second I/F 102 directly communicate each other through a first-in first-out (FIFO) memory (or FIFO) 105 and an address converter (or Address Conv.) 106. Further, in the image processing controller 100, a signal line 107a is connected between the first I/F 101 and an arbiter 110, and a signal line 107b is connected between the second I/F 102 and the arbiter 110.

As shown in FIG. 1, the image processing controller 100 allows the third I/F 103 to perform communication with a ChipSet 151, a CPU 152, and a memory 153. Moreover, the image processing controller 100 allows the HDD I/F module 104 to perform communication with an HDD 154.

Figure 2:
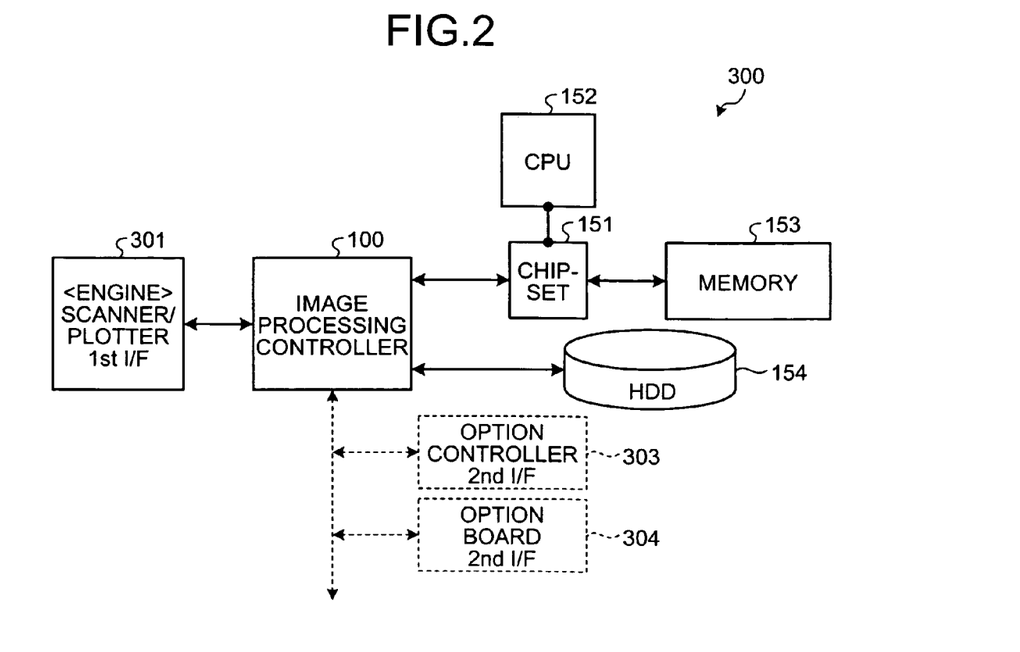
FIG. 2 is a diagram of a hardware configuration of an image forming apparatus that includes the image processing controller.

FIG. 2 is a diagram of a hardware configuration of an image forming apparatus 300 that includes the image processing controller. Referring to FIG. 2, an image processing engine 301 includes the first I/F, while an option controller 303 as an external controller and an option board 304 include the second I/F. When these components are connected to the image processing controller 100, because the image processing controller 100 is provided with both the first and the second I/Fs and also with the FIFO memory that accommodates a difference in speed between the interfaces as shown in FIG. 1, there is no need to provide a switch or a bridge to switch between the interfaces.

The image processing engine (or ENGINE) 301 includes two functions (Scanner/Plotter) such as a scanner engine function and a plotter output engine function.

The scanner engine function of the image processing engine 301 subjects RGB-color image data read by a charge-coupled device (CCD) sensor to image processing, generates CMYK images of 8 bits for each color, and outputs the CMYK images to the image processing controller 100. The image processing performed by the scanner engine function includes edge enhancement of a text area of image data or a smoothing process of a non-text area (picture area).

The plotter output engine function of the image processing engine 301 subjects the image data received from the image processing controller 100 to a binarizing process, and outputs the binarized image data to the plotter.

Figure 10:
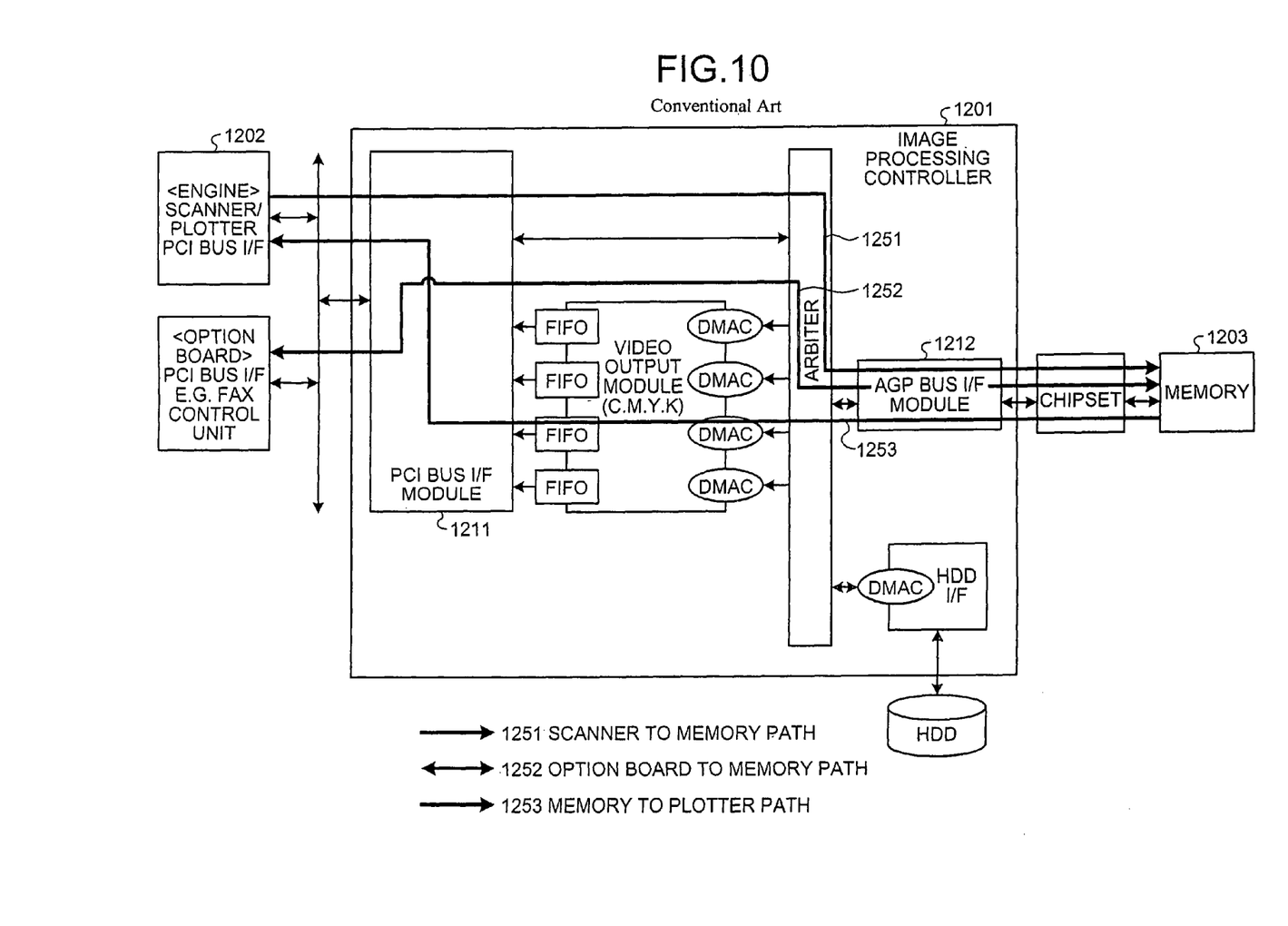
FIG. 10 is a diagram for explaining an image processing controller and its peripheral devices when image data is transferred through a PCI I/F.

How the image processing controller 100 is developed to obtain the configuration as shown in FIG. 1 is explained below with reference to FIGS. 10 and 11. The configuration for a conventional image processing controller is explained first. Conventionally, image data is transferred using a comparatively low-speed interface such as PCI as an engine I/F mounted on the image processing controller. FIG. 10 is a diagram for explaining an image processing controller and its peripheral devices in which image data is transferred through a PCI I/F. As shown in FIG. 10, an image processing engine (or ENGINE) 1202 and an image processing controller 1201 are connected to each other through a PCI bus I/F module 1211, while the image processing controller 1201 and a memory 1203 are connected to each other through an Accelerated Graphics Port (AGP) bus I/F module 1212. The reason why the AGP is used is because a path using the AGP between a ChipSet and a memory is an access path from a CPU to a main memory and the capacity of the access path based on the PCI is not large enough to transfer data. The image data follows communication paths 1251 to 1253 including the PCI bus and the AGP bus.

Because of this, an image processing controller including a higher-speed engine I/F such as the PCIe is required to improve the throughput of data communication.

Figure 11:
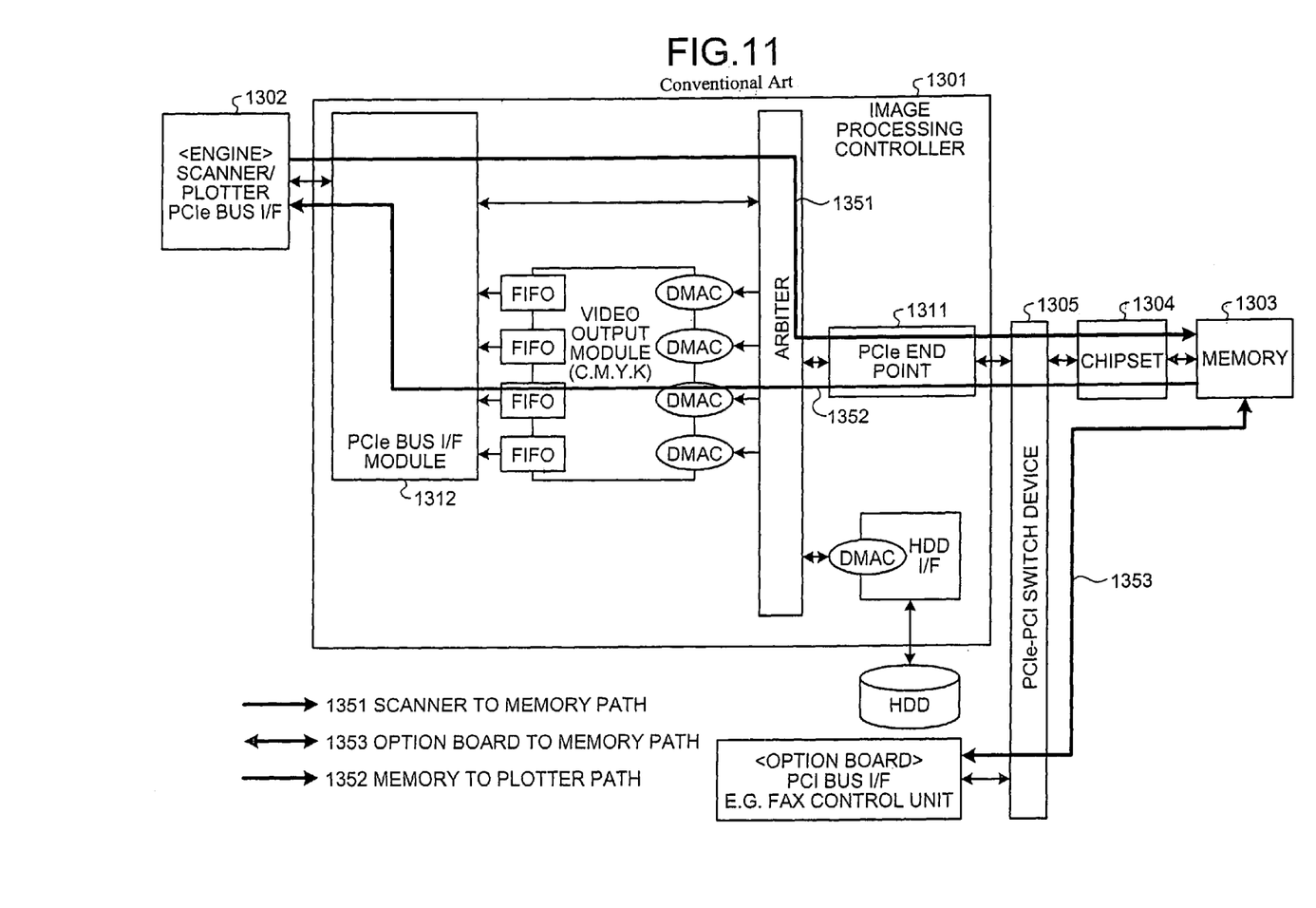
FIG. 11 is a diagram for explaining an image processing controller that includes a PCIe I/F and a switch device, and its peripheral devices.

FIG. 11 is a diagram for explaining an image processing controller that includes a PCIe I/F and a switch device, and its peripheral devices. In the configuration shown in FIG. 11, an interface between an image processing controller 1301 and an image processing engine (or ENGINE) 1302 is changed from the PCI to the PCIe. Specifically, both are connected to each other through a PCIe bus I/F module 1312. Moreover, because the PCIe can perform data transfer at a speed higher than that of the AGP, by providing a PCIe end point 1311, the AGP between ChipSet 1304 and a memory 1303 can be changed to the PCIe. Accordingly, specifications can be unified to a specification having compatibility with software for the PCI. As a result, the image data follows communication paths 1351 to 1353 according to switching by a PCIe-PCI switch device 1305.

As explained above, the PCIe-PCI switch device 1305 is required to connect to a device such as a facsimile (fax) control unit using the PCI bus, and this causes an increase in manufacturing costs.

Moreover, there may be a case where manufacturers of image forming apparatuses manufacture two types of image forming apparatuses such as ones requiring high manufacturing costs yet capable of high-speed transfer and ones requiring low manufacturing costs yet capable of only low-speed transfer. In this case, another image processing controller for low-speed transfer which does not use the PCIe is also required in addition to the image processing controller capable of high-speed transfer as shown in FIG. 11. In this case, the manufactures have to develop two types of image processing controllers such as the image processing controller for high-speed transfer and the image processing controller for low-speed transfer even if their functions are common. Thus, the development burden is increased, and the development cost thereby tends to be increased.

The image processing controller according to the first embodiment is therefore configured as shown in FIG. 1. The configuration is specifically explained below with reference to FIG. 3 that details the configuration shown in FIG. 1. In the example shown in FIG. 3, the image processing controller 100 is configured so that the image processing engine 301 is connected to the first I/F 101 and the option board 304 is connected to the second I/F 102. The option board 304 may be any device such as a fax control unit.

Figure 3:
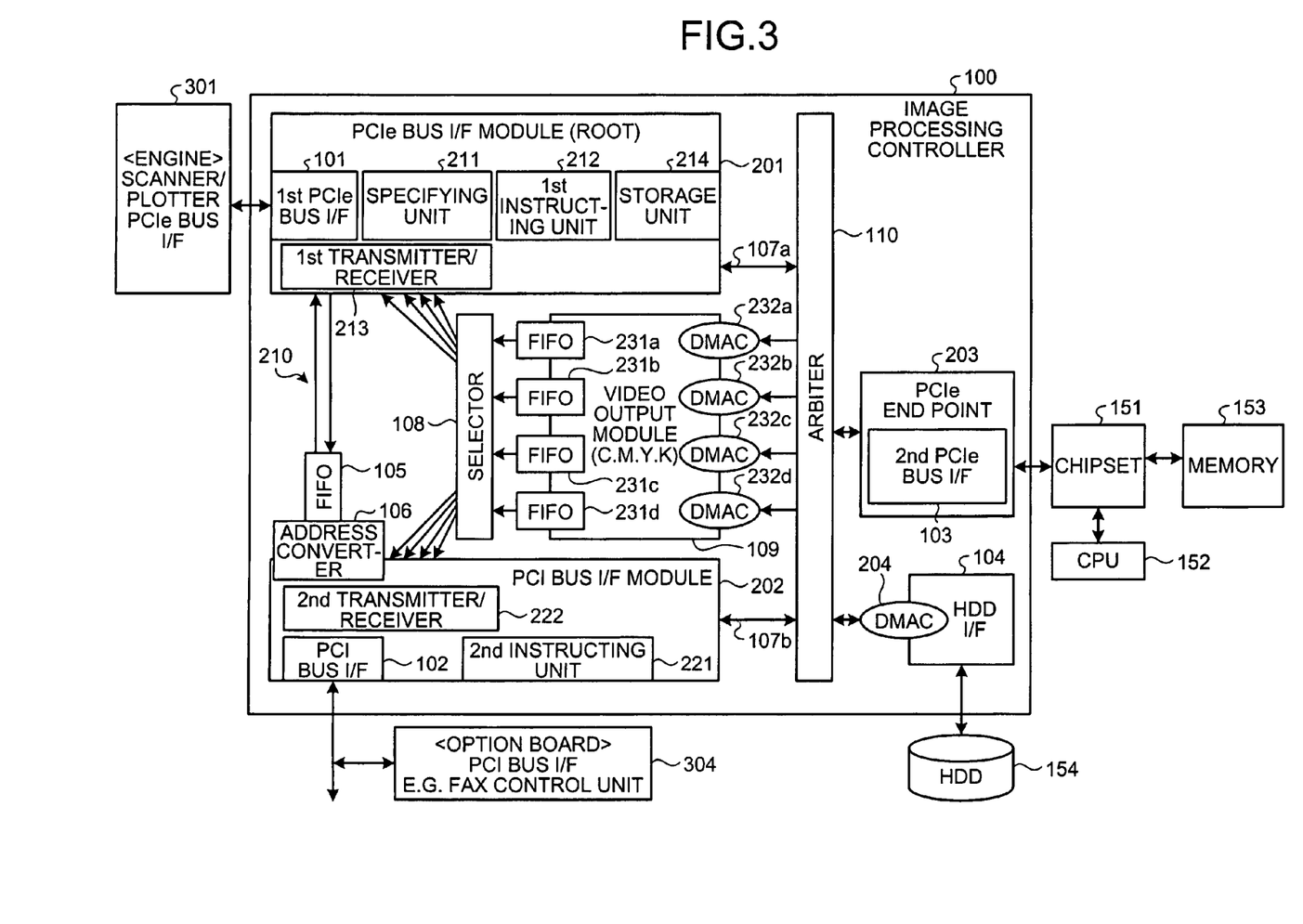
FIG. 3 is a detailed block diagram of the image processing controller according to the first embodiment and its peripheral devices.

FIG. 3 is a detailed block diagram of the image processing controller according to the first embodiment and its peripheral devices.

The image processing controller 100 shown in FIG. 3 includes a PCIe bus I/F module 201, a PCI bus I/F module 202, the FIFO memory 105, the address converter 106, a selector 108, the arbiter 110, a PCIe end point 203, the HDD I/F module 104, a direct memory access controller (DMAC) 204, a video output module 109, DMACs 232a to 232d, and FIFO memories 231a to 231d.

As shown in FIG. 3, the image processing controller 100 includes a first PCIe bus I/F 101 as the first I/F 101 provided on the engine side, and a PCI bus I/F 102 as the second I/F 102.

The image processing controller 100 also includes a second PCIe bus I/F 103 as the third I/F 103 provided on the ChipSet side. In the image processing controller 100, the second PCIe bus I/F 103 can be connected to the memory 153 and the CPU 152.

The PCIe bus I/F module 201 and the PCI bus I/F module 202 are connected to each other through a first signal line 210 via the FIFO memory 105 and the address converter 106.

Further, the PCIe bus I/F module 201 and the arbiter 110 are connected to each other through a second signal line 107a as the signal line 107a, and the PCI bus I/F module 202 and the arbiter 110 are connected to each other through a third signal line 107b as the signal line 107b.

The PCIe bus I/F module 201 includes the first PCIe bus I/F 101, a specifying unit 211, a first instructing unit 212, a first transmitter/receiver 213, and a storage unit 214, and functions as a tree-structured Root Complex (ROOT) including the PCIe end point 203. Furthermore, the PCIe bus I/F module 201 transmits or receives data between the image processing engine 301, the PCI bus I/F module 202, and the PCIe end point 203.

The first PCIe bus I/F 101 is controlled by the PCIe bus I/F module 201 to enable data transmission or data reception to or from the image processing engine 301 connected thereto through the PCIe bus. The data to be transmitted or received includes image data and commands containing address information.

The specifying unit 211 detects an address attached to a received command (write or read) when the first PCIe bus I/F 101 receives the command from the image processing engine 301 or the like, and specifies an access destination of the command based on the detected address.

The specified access destination in a case of write command is set to the second PCIe bus I/F 103 connected to the memory 153 or the like and to the PCI bus I/F 102 in the PCI bus I/F module 202. In a case of read command, the access destination includes the video output module 109 in addition to the two access destinations.

If the command is the write command of image data, the specifying unit 211 specifies a write destination (transmission destination) of the image data received from the image processing engine 301.

The storage unit 214 stores therein an address contained in a command in association with an access destination based on the command. A relationship between the address and the access destination may be previously incorporated into a program that forms the PCIe bus I/F module 201.

Accordingly, when the PCIe bus I/F module 201 receives a command from the image processing engine 301, the specifying unit 211 can specify an access destination of the command from the address in the command by referring to the storage unit 214.

The first instructing unit 212 is arranged inside of the PCIe bus I/F module 201 (on the first PCIe bus I/F 101 side through the first signal line 210), and issues instructions such as data write and data read to components connected thereto such as the FIFO memory 105, the PCI bus I/F module 202, the video output module 109, the PCIe end point 203 (the second PCIe bus I/F 103), and the first transmitter/receiver 213 or the like. The first instructing unit 212 may also issue instructions to the memory 153 connected thereto through the PCIe end point 203 to write data and read data.

For example, when the command received from the image processing engine 301 is the read command of image data to the PCI bus I/F 102, the first instructing unit 212 instructs the PCI bus I/F module 202 to write the image data received by the PCI bus I/F 102 onto the FIFO memory 105, and then instructs the first transmitter/receiver 213 to read image data from the FIFO memory 105 for each predetermined amount of data used by the image processing engine 301. It is noted that the predetermined amount of data can be, for example, a PCIe packet size. However, the predetermined amount of data is not limited to the PCIe packet size, and thus the predetermined amount of data may be a data amount required for transfer at a time, that is, the predetermined amount of data is simply a data amount transmittable at a time specified by communication specifications.

The first transmitter/receiver 213 transmits or receives data to or from the PCI bus I/F module 202 connected thereto through the FIFO memory 105, the address converter 106, and the first signal line 210.

The first signal line 210 functions as a communication path that connects between the PCIe bus I/F module 201 and the PCI bus I/F module 202 and transmits or receives data therethrough.

The FIFO memory 105 is provided on the first signal line 210, and temporarily stores therein data to be transferred when the data is transferred between the PCIe bus I/F module 201 and the PCI bus I/F module 202 connected to each other through the first signal line 210.

More specifically, when the specifying unit 211 specifies the PCI bus I/F 102 as the write destination of the write command, the first transmitter/receiver 213 transmits the image data as an object to be written of the write command to the first signal line 210. In this case, the image data transferred to the first signal line 210 is temporarily stored in the FIFO memory 105, and then received by the PCI bus I/F module 202.

A storage amount that can be stored in the FIFO memory 105 is determined based on a difference in speed between the PCIe and the PCI and also based on the amount of image data transferred or received between the PCIe bus I/F module 201 and the PCI bus I/F module 202.

As a specific example, the option board 304 connected to the PCI bus I/F 102 performs processing only on image data such as fax data for use in transfer which is a comparatively small amount of data. The scanner engine function of the image processing engine 301 reads the image data, and the image processing engine 301 sequentially transmits data packet by packet of PCIe from the read image data. The transmitted image data is stored in the FIFO memory 105. In other words, the FIFO memory 105 has to ensure a storage capacity for the PCIe packet size as a minimum limit.

If the PCI bus I/F 102 can transmit the image data stored in the FIFO memory 105 to the option board 304 by the time the image processing engine 301 transmits the next image data, the capacity for the PCIe packet size is sufficient enough for the storage capacity of the FIFO memory 105. And data can thereby be transmitted or received between the PCIe and the PCI whose speeds are different from each other. If the PCI bus I/F 102 cannot transmit the image data to the option board 304 by the time the image processing engine 301 transmits the next image data, the storage capacity of the FIFO memory 105 has to be increased according to the difference in speed. However, in the case of fax, data transfer speed is not necessarily as high as other transfer speed, and thus, as the minimum limit, only the capacity for the packet size is enough for the capacity of the FIFO memory 105.

As a transmission interval of image data transmitted from the image processing engine 301, a read interval or the like can be thought of. The read interval is an interval at which the scanner engine function of the image processing engine 301 mechanically reads image data. In this case, the image processing controller 100 can transfer image data directly from the PCIe bus I/F module 201 to the PCI bus I/F module 202 without allowing for the difference in speed between the PCIe and the PCI.

The PCI bus I/F module 202 transfers the image data received from the video output module 109 through the PCIe bus I/F module 201, the PCIe end point 203, and the selector 108, to options such as the option board 304 connected to the PCI bus. To transfer the image data, a PCI address needs to be generated according to an option which is the transfer destination of data. The first embodiment is, therefore, provided with the address converter 106.

The address converter 106 converts between an address space used by the PCIe bus I/F module 201 and an address space used by the PCI bus I/F module 202. Based on the converting process, for example, an address of a write destination that is transferred from the PCIe bus I/F module 201 can be converted to an address used by the PCI bus I/F module 202 as the write destination.

An example of the address converter 106 includes a direct memory access (DMA) controller. The DMA controller generates a PCI address according to an option of an access destination, and the PCI bus I/F module 202 controls the access according to the generated PCI address. An arrangement of an address map to respective options can be set by using a register.

Moreover, the address converter 106 includes a function of detecting an address contained in a command transferred from each option connected to the PCI bus and of specifying an access destination based on the command from the detected address. The function allows the PCI bus I/F module 202, explained later, to access the access destination based on the command transferred from the option.

The PCI bus I/F module 202 includes a second transmitter/receiver 222, the PCI bus I/F 102, and a second instructing unit 221 in addition to the address converter 106. Further, the PCI bus I/F module 202 transmits or receives data between peripheral devices such as the option board 304 connected thereto through the PCI bus, the PCIe bus I/F module 201, and the PCIe end point 203.

The second transmitter/receiver 222 transmits or receives data to or from the PCIe bus I/F module 201 through the FIFO memory 105, the address converter 106, and the first signal line 210.

The PCI bus I/F 102 is controlled by the PCI bus I/F module 202 to transmit or receive data to or from the peripheral devices such as the option board 304. The data to be transmitted or received includes image data and commands containing addresses. The PCI bus I/F 102 also performs data transmission or reception at a transmission speed lower than that of the first PCIe bus I/F 101.

The second instructing unit 221 is disposed inside the PCI bus I/F module 202 or on the PCI bus I/F 102 side through the first signal line 210, and issues an instruction to the peripheral device to read data or write data, the peripheral device being connected thereto through the video output module 109, the PCIe end point 203, and the PCI bus. The second instructing unit 221 may also issue an instruction to the memory 153 connected thereto through the PCIe end point 203 to perform read or write operations.

The PCIe bus I/F module 201 and the PCI bus I/F module 202 are connected to each other through the first signal line 210, and this allows direct transfer of data therebetween. A data transfer method therebetween may be any method, and thus, for example, the DMA may be used to perform data transfer.

More specifically, the conventional image processing controller has to once store the image data received from the PCIe bus I/F module in the memory and then transfer the image data from the memory to the PCI bus I/F module. Because of this, bandwidths between the PCIe bus I/F module and the memory and between the memory and the PCI bus I/F module have to be used, and this prevents transfer of other data.

On the other hand, the image processing controller 100 according to the first embodiment transfers data directly from the PCIe bus I/F module 201 to the PCI bus I/F module 202. Therefore, the bandwidths between the PCIe bus I/F module 201 or the PCI bus I/F module 202 and the memory 153 are not used, and this facilitates the transfer of other data by using these bandwidths. Namely, the processing speed in the image processing controller 100 is improved.

The arbiter 110 arbitrates the usage of the bus.

The PCIe end point 203 includes the second PCIe bus I/F 103, and transmits and receives data between the peripheral devices, the PCIe bus I/F module 201, and the PCI bus I/F module 202. In this case, the peripheral devices include the memory 153 and the CPU 152 connected to the second PCIe bus I/F 103 through the PCIe bus.

The second PCIe bus I/F 103 is controlled by the PCIe end point 203 to transmit or receive data with the device such as the memory 153 or the CPU 152 connected thereto through the PCIe bus. The data to be transmitted or received includes image data and commands containing addresses.

The HDD I/F module 104 includes the interface connected to the HDD 154, and controls the interface to transmit or receive data to or from the HDD 154.

The DMAC 204 is a controller that transfers data using a DMA transfer method between the PCI bus I/F module 202, the video output module 109, and the PCIe bus I/F module 201.

The DMACs 232*a* to 232*d* transfer image data on the memory 153 to the video output module 109.

The video output module 109 outputs the image data transferred from the DMACs 232*a* to 232*d* to the image processing engine 301 through the FIFO memories 231*a* to 231*d* for each color of cyan (C) version, magenta (M) version, yellow (Y) version, and black (K) version, respectively. The output image data are transferred to the plotter output engine function mounted on the image processing engine 301.

The FIFO memories 231*a* to 231*d* temporarily store therein the image data output from the video output module 109 for each of the colors respectively. Thereafter, the image data are transmitted to an output destination selected by the selector 108.

The selector 108 receives a selection of either the PCIe bus I/F module 201 or the PCI bus I/F module 202 as the output destination of the image data output from the video output module 109, based on register setting. Then, the selector 108 outputs the image data to either the PCIe bus I/F module 201 or the PCI bus I/F module 202 according to the received selection.

As explained above, the image processing controller 100 is provided with the selector 108, and can thereby select either one of the first and the second I/Fs such as the PCIe and the PCI whose speed is different, as an output destination. Consequently, the image processing controller 100 can appropriately output the image data to the image processing engine regardless of on which side of the first and the second I/Fs the image processing engine is provided.

More specifically, the image processing controller 100 according to the first embodiment has both functions of an image processing controller for an image processing engine connectable to the first I/F such as PCIe and an image processing controller for an image processing engine connectable to the second I/F such as PCI. In this manner, the image processing controller 100 according to the first embodiment can play a role as two types of image processing controllers whose speed is different from each other. Thus, there is no need to provide the image processing controllers for the first I/F and the second I/F, which enables to ease the development burden and to reduce the development cost.

The image processing controller 100 according to the first embodiment includes the FIFO memory 105 that is connected between the first I/F 101 and the second I/F 102 to accommodate the difference in speed therebetween, which enables to directly transmit or receive data therebetween.

The PCIe bus I/F module 201 of the image processing controller 100 can select the second I/F 102 or the memory 153 as the access destination based on the address in the command transferred from the image processing engine 301. Therefore, by using the image processing controller 100, there is no need to provide the switch device for use in connection between different interfaces such as the PCIe and the PCI. Accordingly, it is possible to facilitate manufacture of the image forming apparatus using the image processing controller 100 and to reduce manufacturing costs.

Moreover, the image processing controller 100 can perform data transfer between the first I/F 101 and the second I/F 102 without using the memory 153. Thus, it becomes easier to ensure the bandwidths between the first I/F 101 or the second I/F 102 and the memory 153, which enables to speed up the processing using the bandwidths.

The image forming apparatus 300 according to the first embodiment performs both communications of scanner data from the image processing engine 301 and of plotter data from the option controller 303 through the FIFO memory 105 and the address converter 106. The image forming apparatus 300 can also use a method of temporarily storing the scanner data sent from the image processing engine 301 in the memory 153 through the memory arbiter (arbiter 110) depending on the situations of the FIFO memory 105 and the address converter 106 and then transferring the scanner data to the option controller 303. The option board 304 performs communication with the memory 153 through the memory arbiter (arbiter 110).

Figure 4:
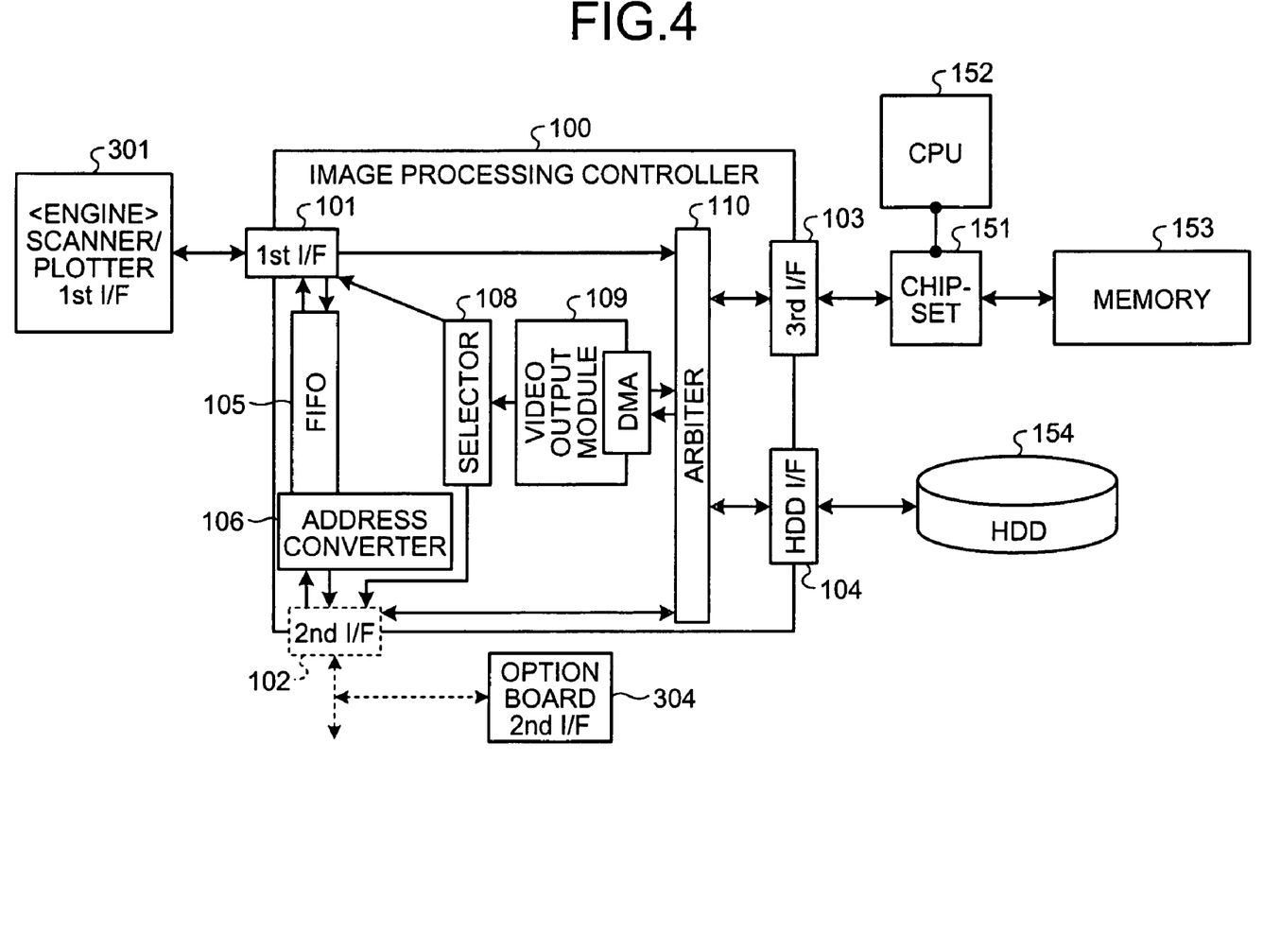
FIG. 4 is a conceptual diagram of the image processing controller and its peripheral devices when a selector sets an output destination to a PCIe bus I/F.

The case where the selector 108 sets the output destination to the first PCIe bus I/F 101 in the image processing controller 100 is explained below. FIG. 4 is a conceptual diagram of the image processing controller 100 and the peripheral devices when the selector 108 sets an output destination to the first PCIe bus I/F 101.

In the concept as shown in FIG. 4, the scanner data sent from the image processing engine 301 is stored in the memory 153 through the arbiter 110. The plotter data formed in the image processing controller 100 is output to the first I/F side or to the first PCIe bus I/F 101 side. The option board 304 performs communications with the memory 153 through the arbiter 110.

Figure 5:
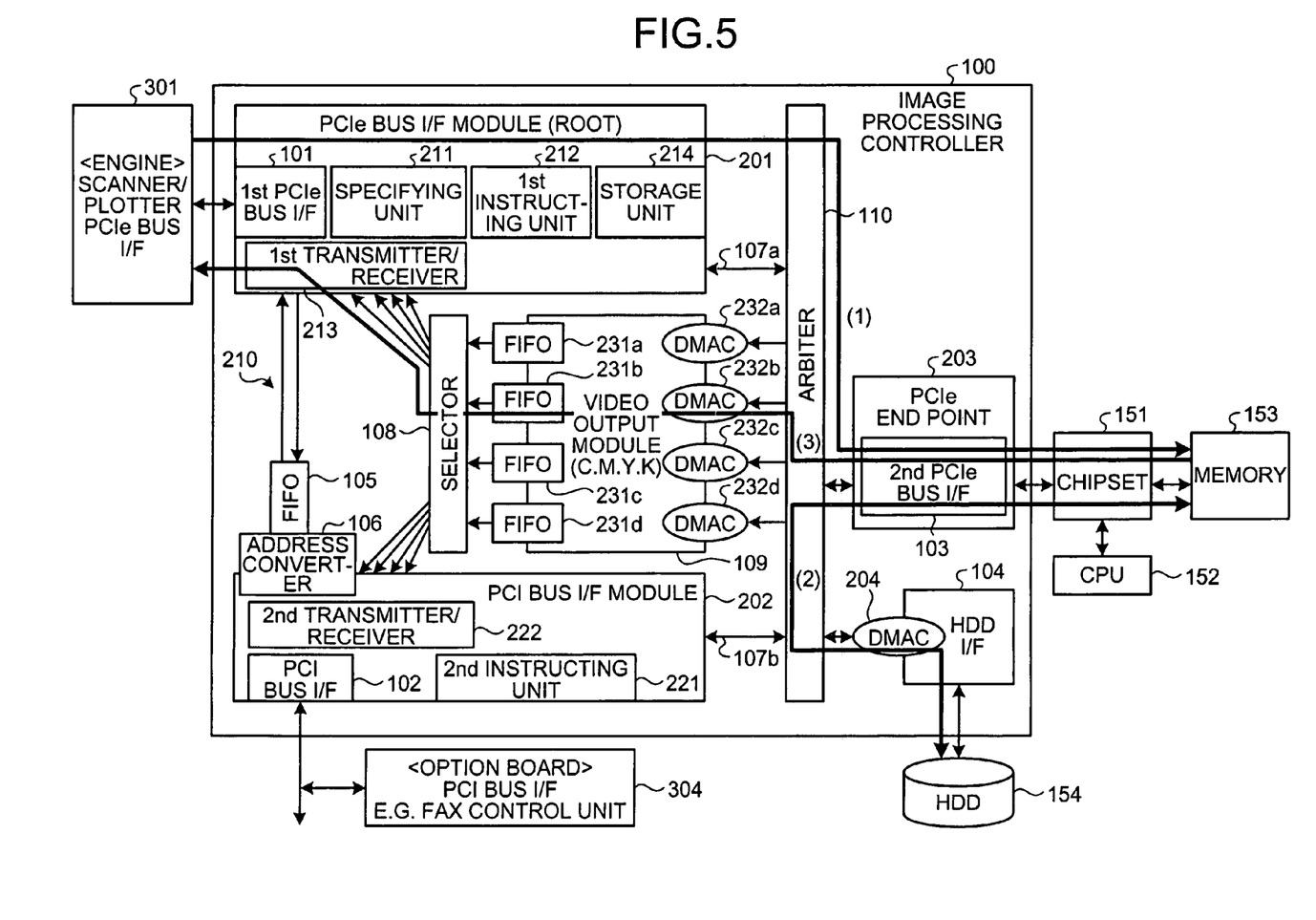
FIG. 5 is a diagram of transfer paths for transferring image data from a scanner engine function of an image processing engine to a memory, from the memory to a hard disk drive (HDD), and from the memory to a plotter output engine function of the image processing engine.

The communication path of data when the configuration is provided as shown in FIG. 4 is explained below. FIG. 5 is a diagram of transfer paths for transferring image data from the scanner engine function of the image processing engine 301 to the memory 153, from the memory 153 to the HDD 154, and from the memory 153 to the plotter output engine function of the image processing engine 301.

A transfer path (1) shown in FIG. 5 is a path for transferring image data from the scanner engine function of the image processing engine 301 to the memory 153. The image processing engine 301 issues a write command of image data to a predetermined address. When the first PCIe bus I/F 101 receives the write command, the specifying unit 211 specifies a write destination based on the address contained in the write command. In the example shown in the communication path (1) shown in FIG. 5, the write destination is specified as the memory 153. The first instructing unit 212 of the PCIe bus I/F module 201 outputs the write command to the memory 153 through the PCIe end point 203 (third I/F). Thereafter, the image data is stored in the memory 153 according to the write command.

A transfer path (2) shown in FIG. 5 is a transfer path for image data transmitted or received between the memory 153 and the HDD 154. The image processing controller 100 uses the DMAC 204 provided in the HDD I/F module 104 to store the image data on the memory 153 in the HDD 154. Moreover, the image processing controller 100 uses the DMAC 204 to expand the image data stored in the HDD 154, in the memory 153.

Functions (not shown) for performing image processing in the image processing controller 100 can perform processes, such as rotation, compression, decompression, and editing, on the image data on the memory 153 by using each DMA for each of the functions.

A transfer path (3) shown in FIG. 5 is a path for transferring image data from the memory 153 to the plotter output engine function of the image processing engine 301. The image processing engine 301 issues a read command of image data to a predetermined address. When the first PCIe bus I/F 101 receives the read command, the specifying unit 211 specifies a read destination based on the address contained in the read command. In the example shown in FIG. 5, the video output module 109 is specified as the read destination. The first instructing unit 212 of the PCIe bus I/F module 201 outputs the read command to the video output module 109. The video output module 109 receives, in response to the read command, image data for the colors from the memory 153 through the PCIe end point 203, and transfers the image data to the PCIe bus I/F module 201 through the FIFO memories 231a to 231d respectively. The PCIe bus I/F module 201 outputs the received image data for the colors to the plotter output engine function of the image processing engine 301.

Figure 6:
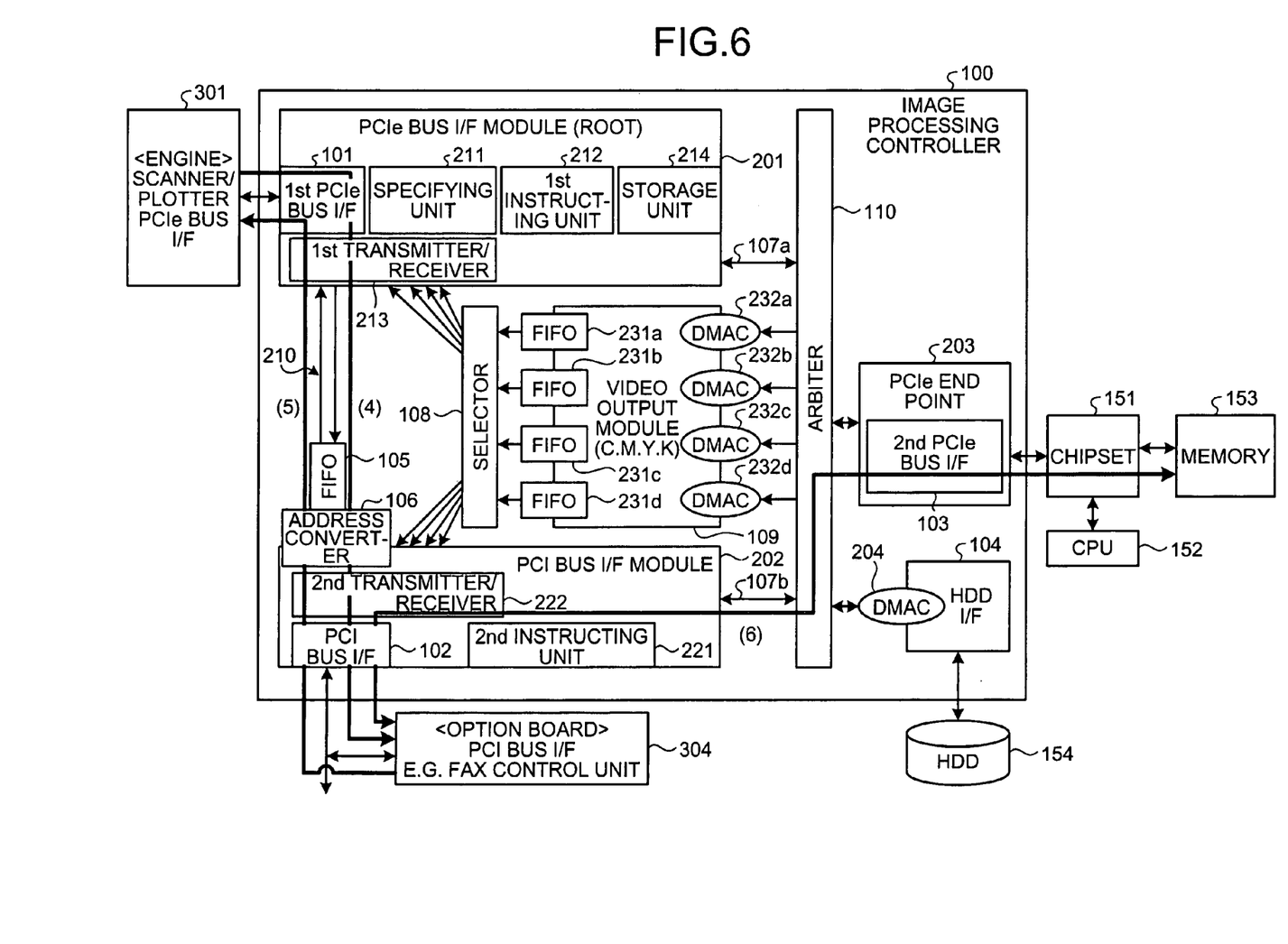
FIG. 6 is a diagram of transfer paths for transfer of image data between the image processing engine and an option board and between the option board and the memory.

FIG. 6 is a diagram of transfer paths for transfer of image data between the image processing engine 301 and the option board 304 and between the option board 304 and the memory 153.

A transfer path (4) shown in FIG. 6 is a path for directly transferring image data from the scanner engine function of the image processing engine 301 to the option board 304 (fax control unit). The image processing engine 301 operates as a master based on a master (main)-slave (dependent on the master) relationship.

More specifically, the image processing engine 301 issues a write command of image data for a predetermined address to the image processing controller 100. When the first PCIe bus I/F 101 of the PCIe bus I/F module 201 receives the write command, the specifying unit 211 specifies the option board 304 (fax control unit) as the write destination based on the address contained in the write command. The first transmitter/receiver 213 outputs the write command to the PCI bus I/F module 202 through the first signal line 210.

When the PCI bus I/F module 202 receives the write command, the address converter 106 converts the address contained in the write command to a specified address. The second instructing unit 221 outputs the write command to the option board 304 through the PCI bus I/F 102 according to the converted address. As a result, the transfer of the image data from the image processing engine 301 to the option board 304 and the write operation thereof are performed.

As explained above, the deference in speed between the PCIe and the PCI can be accommodated by passing the image data through the FIFO memory 105 during the transfer process. If the image processing engine 301 operates as the master, the option board (fax control unit) 304 operates as the slave.

A transfer path (5) shown in FIG. 6 is a path for transferring image data input in the option board (fax control unit) 304 to the plotter output engine function of the image processing engine 301. The image processing engine 301 also operates as the master during the transfer process using the transfer path (5).

More specifically, the image processing engine 301 issues a read command of image data for a predetermined address to the image processing controller 100. When the first PCIe bus I/F 101 of the PCIe bus I/F module 201 receives the read command, the specifying unit 211 specifies the option board (fax control unit) 304 as a read destination based on the address contained in the read command. The first transmitter/receiver 213 outputs the read command to the PCI bus I/F module 202 through the first signal line 210.

When the PCI bus I/F module 202 receives the read command, the address converter 106 converts the address contained in the read command to a specified address. The second instructing unit 221 outputs the read command to the option board 304 through the PCI bus I/F 102 according to the converted address. As a result, the image data is transferred from the option board 304 to the image processing engine 301. In the process shown by the transfer path (5), the image processing engine 301 also operates as the master, and the option board (fax control unit) 304 operates as the slave.

In the process shown by the transfer path (5), the data transfer from the option board (fax control unit) 304 to the image processing engine 301 can be performed without passing through the ChipSet 151 and the memory 153. This process can be implemented by providing the FIFO memory 105 between the PCIe bus I/F module 201 and the PCI bus I/F module 202.

When copying is operated, the image processing engine 301 as the master outputs the read command of image data to the memory 153 on the ChipSet 151 side, to perform the process.

In the transfer path (5), the image processing engine 301 as the master requests an operation from the fax control unit 304. The image processing engine 301 can process color image data (multivalued image data) upon copying, while monochrome image data (binary image data) is transferred from the fax control unit 304. Because of this, the transmission speed of the image processing engine 301 is provided sufficiently high enough to correspond to the transfer speed of the fax control unit 304.

The PCI bus I/F module 202 temporarily stores the monochrome image data transferred from the fax control unit 304 in the FIFO memory 105 based on the read command. Thereafter, the image processing engine 301 outputs the read command to the PCIe bus I/F module 201, and the PCIe bus I/F module 201 transfers the monochrome image data stored in the FIFO memory 105 to the image processing engine 301 based on the read command.

With these processes, the image data more than a data amount required for printing by the plotter output engine function of the image processing engine 301 is temporarily stored in the FIFO memory 105, and the PCIe bus I/F module 201 can acquire the image data by the data amount from the FIFO memory 105. Consequently, the PCIe bus I/F module 201 can reliably transfer the image data to the image processing engine 301 without being affected by delay of the process in the PCI bus I/F module 202. It is noted that the FIFO memory 105 may have a storage capacity for one PCIe packet or more as the data amount required for printing, or may store therein image data for one line in a main scanning direction upon printing or the like.

Moreover, if the read destination is the FIFO memory 105, the PCIe bus I/F module 201 can reduce a read time because the transfer path to the FIFO memory 105 is shorter than the case where the read destination is the fax control unit 304.

A transfer path (6) shown in FIG. 6 is a path for transferring image data input in the option board (fax control unit) 304 to the memory 153. The fax control unit 304 operates as the master during the transfer process using the transfer path (6).

The fax control unit 304 outputs a write command of image data for a predetermined memory address. The address converter 106 of the PCI bus I/F module 202 specifies an access destination from the memory address contained in the write command. The specified access destination is assumed as the memory 153. In this case, the second instructing unit 221 outputs the write command to the memory 153 as the access destination through the second transmitter/receiver 222. Thereafter, the image data is written onto the memory 153 based on the write command.

Moreover, if the fax control unit 304 as the master outputs a read command of image data for a predetermined memory address, the address converter 106 specifies an access destination from the memory address contained in the read command. If the specified access destination is the memory 153, the second instructing unit 221 outputs the read command to the memory 153 as the access destination through the second transmitter/receiver 222. Thus, the image data is read from the memory 153 based on the read command.

As explained above, in the transmission path (6) shown in FIG. 6, data can be bidirectionally transferred between the fax control unit 304 and the memory 153.

In the image forming apparatus 300 according to the first embodiment, the example in which the image processing engine 301 is connected to the image processing controller 100 through the PCIe bus is explained. However, the image processing controller 100 can connect the image processing engine to the PCI bus side by changing an output destination of the selector 108. In an image processing device according to a second embodiment, an example in which an image processing engine is connected to the PCI bus side of the image processing controller 100 is explained below. In the following explanation, the same reference numerals are assigned to those corresponding to the components according to the first embodiment, and explanation thereof is omitted.

Figure 7:
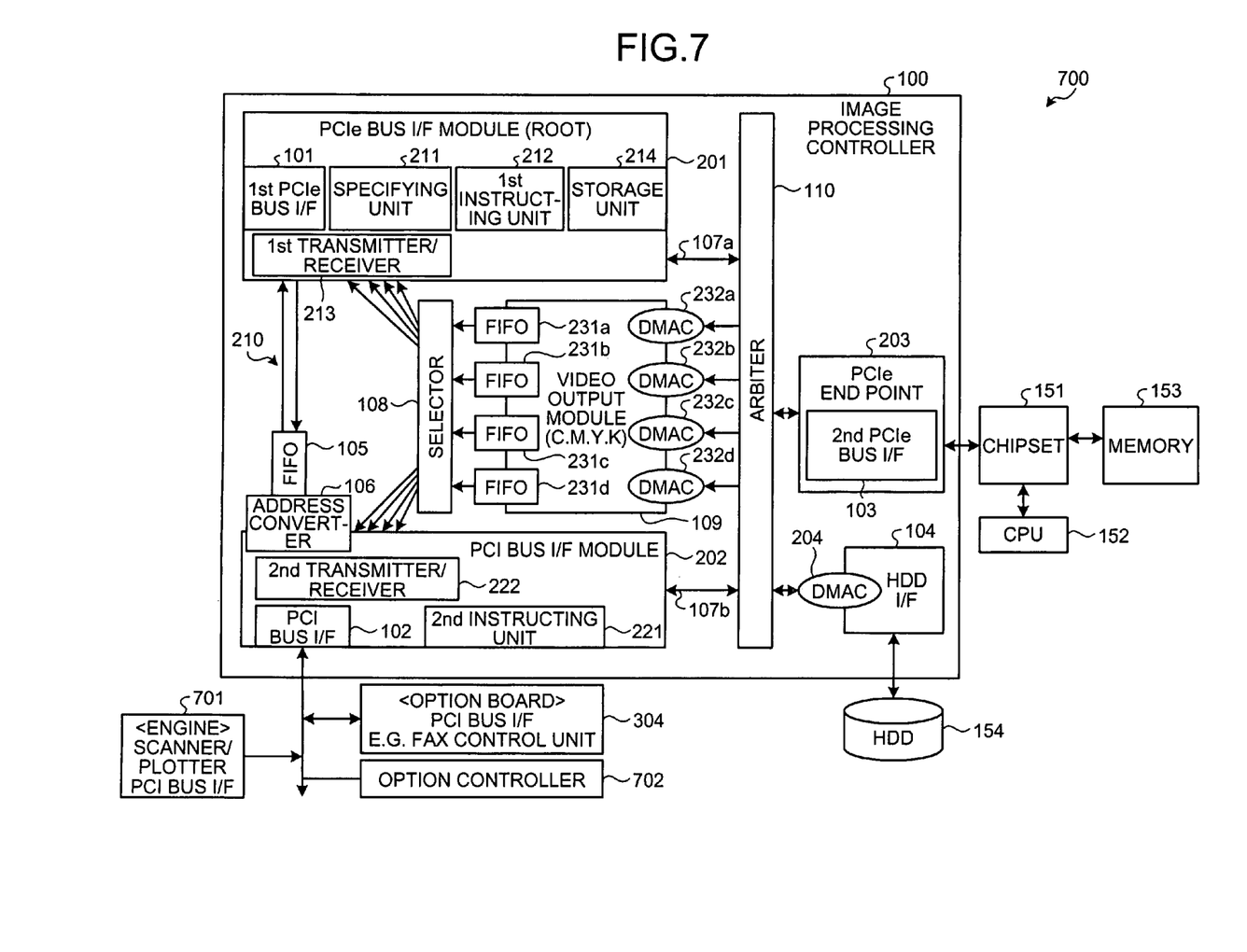
FIG. 7 is a block diagram of an image forming apparatus according to a second embodiment.

FIG. 7 is a block diagram of an image forming apparatus 700 according to the second embodiment. In the image forming apparatus 700, an image processing engine (or ENGINE) 701 and an option controller 702 are arranged on the PCI bus side of the image processing controller 100.

Figure 8:
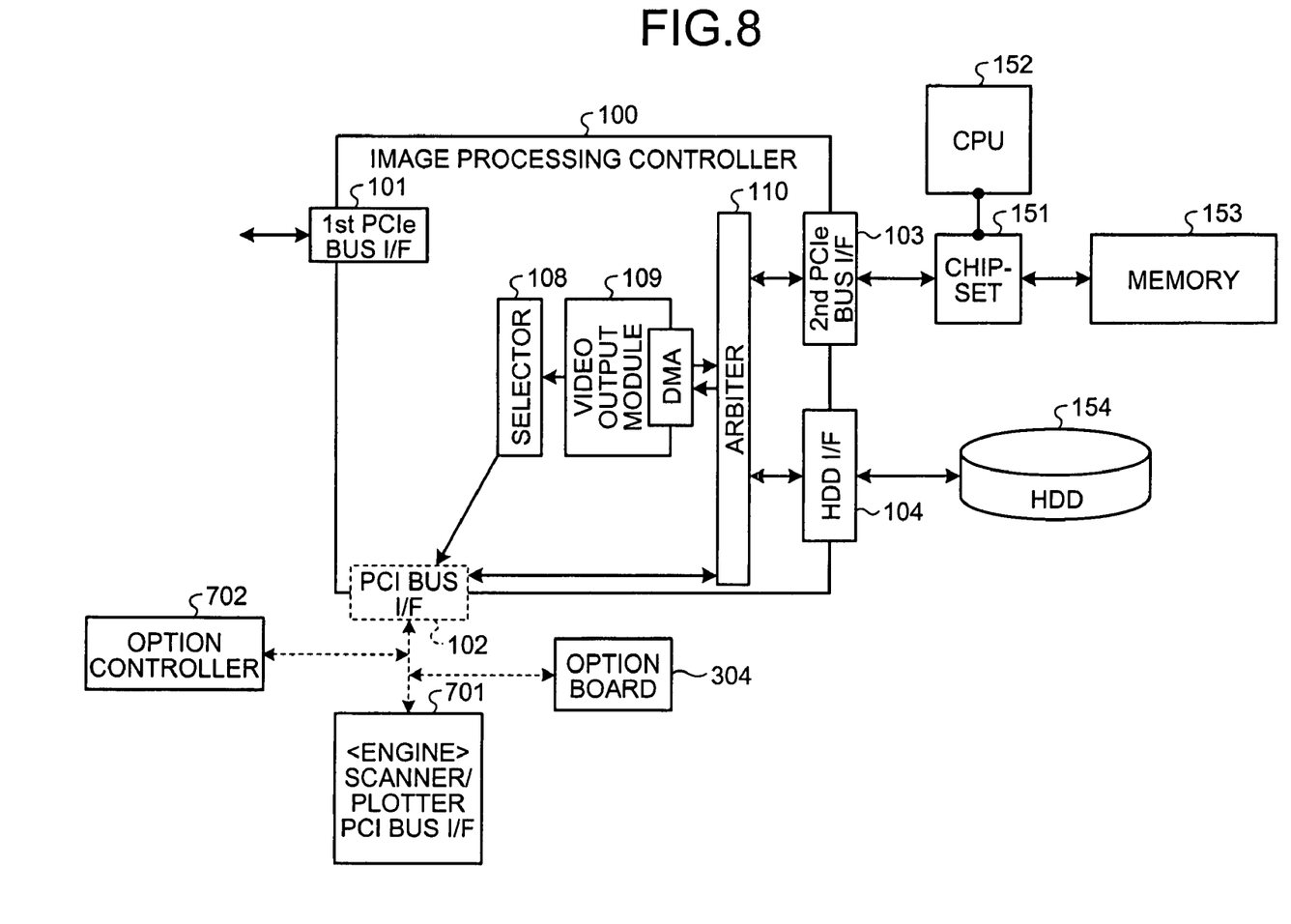
FIG. 8 is a diagram for explaining a functional concept of an image processing controller according to the second embodiment.

FIG. 8 is a diagram for explaining a functional concept of the image processing controller 100 according to the second embodiment. As shown in FIG. 8, the selector 108 sets an output destination to the PCI bus I/F 102, and the first PCIe bus I/F 101 is not therefore used. Thus, it can be seen that the image processing controller 100 functions as one to perform image processing at a low speed.

In the concept shown in FIG. 8, scanner data sent from the image processing engine 701 is stored in the memory 153 through the arbiter 110. Plotter data formed in the image processing controller 100 is output to the PCI side by the selector 108. Moreover, the option board 304 also performs communication with the memory 153 through the arbiter 110 in the same manner as the scanner data.

Furthermore, in the concept shown in FIG. 8, communications of the scanner data from the image processing engine 701 and of the plotter data from the option controller 702 with the image processing controller 100 are performed through the PCI bus. The option controller 702 accesses the HDD 154 through the arbiter 110 and the memory 153. Further, the option board 304 performs communication with the memory 153 through the arbiter 110.

Figure 9:
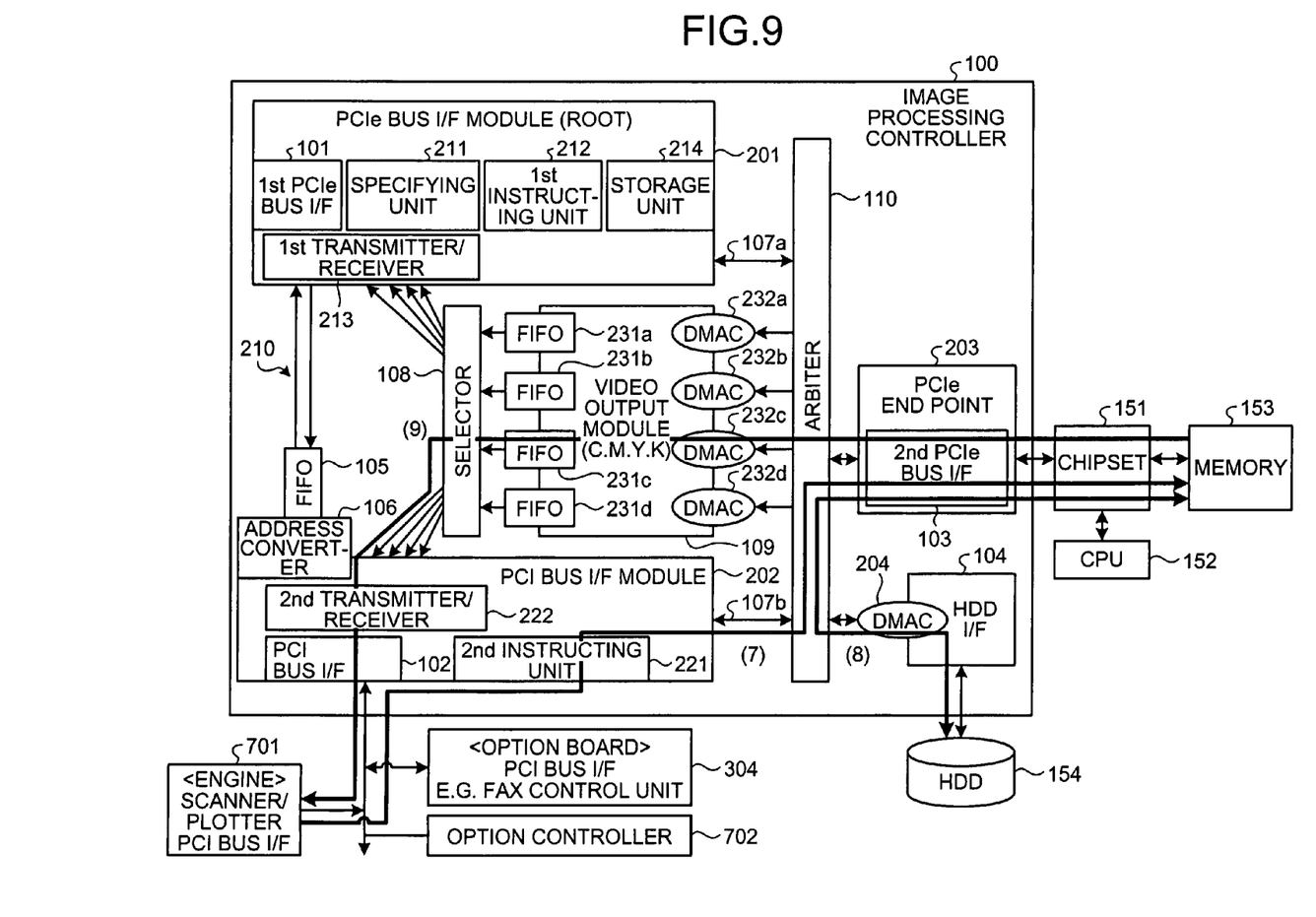
FIG. 9 is a diagram of transfer paths for image data transferred by using the image processing controller when the image processing engine is connected to the PCI side.

FIG. 9 is a diagram of transfer paths for image data transferred by using the image processing controller 100 when the image processing engine 701 is connected to the PCI side.

A transfer path (7) shown in FIG. 9 is a path for transferring image data input from the scanner engine function of the image processing engine 701 to the memory 153. In this case, the image processing engine 701 operates as the master, and outputs a write command of image data to a predetermined address. The address converter 106 of the PCI bus I/F module 202 specifies an access destination from the memory address contained in the write command. The specified access destination is set to the memory 153. In this case, the second instructing unit 221 outputs the write command to the memory 153 as the access destination through the second transmitter/receiver 222. Thus, the input image data is written onto the memory 153 based on the write command.

A transfer path (8) shown in FIG. 9 is a transfer path for image data transmitted or received between the memory 153 and the HDD 154, and the process is performed in the same manner as that of the transfer path (2) shown in FIG. 5, and thus explanation thereof is omitted.

A transfer path (9) shown in FIG. 9 is a path for transferring image data stored in the memory 153 to the plotter output engine function (or Plotter) of the image processing engine 701. In this case, the image processing engine 701 operates as the master, and outputs a read command of image data to a predetermined address. The address converter 106 of the PCI bus I/F module 202 specifies an access destination from the memory address contained in the read command. The specified access destination is set to the video output module 109. The second instructing unit 221 outputs the read command to the video output module 109. The video output module 109 receives the image data for the colors from the memory 153 through the PCIe end point 203 in response to the read command. The video output module 109 outputs the received image data to the selector 108. In the second embodiment, the PCI bus I/F module 202 is selected as an output destination of the selector 108, and thus, the image data is transferred to the PCI bus I/F module 202. The PCI bus I/F module 202 outputs the received image data for the colors to the plotter output engine function of the image processing engine 701.

By using the image processing controller 100 according to the second embodiment, the image processing device that includes an image processing engine with the PCIe I/F and an option controller and an option board with the conventional PCI I/F can be implemented without using a switch or a PCIe-PCI bridge, which leads to cost reduction.

The image processing controller 100 includes the PCI I/F in addition to the PCIe I/F, and thus a conventional PCI board can be made effective use of, which leads to cost reduction.

In the image processing controller 100 according to the second embodiment that includes the PCI bus I/F 102 and the first PCIe bus I/F 101, the selector 108 can select an output destination of image data sent from the video output module 109. Therefore, the selection of an output destination by the selector 108 allows the image processing controller 100 to play a role of two types of image processing controllers.

Moreover, the image processing controller 100 can be used for an image processing device using the image processing engine with the PCIe I/F and for an image processing device using the image processing engine with the PCI I/F. More specifically, if the configuration is based on the conventional technology, the image processing controller needs to be developed for each of the two types of high-speed and low-speed engine I/Fs even if the functions are common, which causes unnecessary cost such as the cost for development. On the other hand, by using the image processing controller 100 according to the second embodiment, there is no need to manufacture the image processing controllers for the respective interfaces, which leads to cost reduction.

The embodiments explained above are exemplary embodiments of the present invention, and thus various changes may be made without departing from the scope of the invention. For example, a program to implement the functions of the image processing controller may be loaded into a device, and the functions of the device may be implemented by causing the device to execute the program.

Furthermore, the program may be provided by using a flexible disk (FD) or a magneto-optical disc such as a compact-disk read only memory (CD-ROM) and a digital versatile disk (DVD), which are computer-readable recording media. Alternatively, the program may be transmitted to other computer systems using transmission wave through the Internet and a telephone line which are transmission media. Moreover, an image processing program executed by the image processing controller 100 according to the embodiments may be stored on a computer connected to a network such as the Internet and provided by being downloaded through the network.

The image processing program executed by the image processing controller 100 according to the embodiments is formed of modules including the configurations for performing the processes. Therefore, as actual hardware, the CPU (processor) reads the image processing program from the ROM and executes it, to thereby load the units on a main storage unit and generate the configurations on the main storage unit.

As describe above, according to an aspect of the present invention, the image processing controller includes the first I/F and the second I/F connected to each other through a communication path and also includes the FIFO memory that accommodates the difference in speed between the interfaces. Thus, there is no need to provide a switch or a bridge to change specifications of buses, which allows reduction in manufacturing costs.

Furthermore, an output destination of image data can be switched by the selector, and this configuration enables the image processing controller to play a role of the two types of image processing controllers.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing controller comprising:
    a first interface configured to receive image information and an address indicating an output destination of the image information from an image processing engine configured to perform an image processing;
    a second interface configured to transmit image information to an image processing unit having an image processing capability lower than that of the image processing engine, at a communication speed lower than that of the first interface;
    a communication path configured to connect the first interface and the second interface to exchange data;
    a first-in first-out memory provided on the communication path;
    a third interface configured to transmit images information to an image storage unit at a communication speed, the communication speed being the same as a communication speed of the first interface;
    a specifying unit configured to specify, upon the first interface receiving the address, either one of the second interface and the third interface as a transmission destination of the image information received by the first interface based on the address; and
    a transmitting unit configured to transmit, when the second interface is specified as the transmission destination, the image information to the second interface through the communication path and the first-in first-out memory and transmits, when the third interface is specified as the transmission destination, the image information to the third interface.

2. The image processing controller according to claim 1, wherein
    the first interface is configured to transmit image information to the image processing engine,
    the third interface is configured to receive image information from the image storage unit, and
    the image processing controller further comprises a selecting unit that is configured to selects either one of the first interface and the second interface as a transmission destination of the image information received by the third interface.

3. The image processing controller according to claim 1, wherein
    the transmitting unit is configured to transmit an address indicating an output destination of the image information, and
    the image processing controller further comprises an address converting unit that is configured to convert the address transmitted from the transmitting unit through the communication path into an address on an address space used by the second interface.

4. The image processing controller according to claim 1, wherein
    the first interface is configured to receive the image information in units of data amount that is output from a single image processing by the first external device, and
    the first-in first-out memory has a storage capacity for storing the image information in units of the data amount.

5. The image processing controller according to claim 4, wherein
    the second interface is configured to receive image information from the image processing unit and transmit the received image information through the communication path to the first interface,
    the first interface is configured to transmit the image information received through the communication path and the first-in first-out memory to the image processing engine,
    the image processing controller further comprises an instructing unit that is arranged on a side of the first interface, and
    the instructing unit is configured to instruct the second interface to store the image information received through the communication path by the second interface in the first-in first-out memory, and then instructs the second interface to transmit the image information in units of data amount required for a single image processing by the image processing engine to the first-in first-out memory.

6. The image processing controller of claim 1, wherein
    the first interface is a PCIe bus module, and
    the second interface is a PCI bus module.

7. The image processing controller of claim 6, wherein
    the second interface is configured to directly communicate with an external device.

8. The image processing controller of claim 6, wherein the first interface is configured to communicate directly with the second interface through the communication path, the communication path including the first-in first-out memory and an address converting unit coupled to the first-in first-out memory.

9. The image processing controller of claim 8, wherein the communication path is switchless.

10. An image processing device comprising:
- an image processing engine configured to perform an image processing;
- an image processing unit that has image processing capability lower than that of the image processing engine;
- an image storage unit configured to store therein image data; and
- an image processing controller that includes
    - a first interface configured to receive image information and an address indicating an output destination of the image information from the image processing engine performing an image processing,
    - a second interface configured to transmit image information to the image processing unit having image processing capability lower than that of the image processing engine, at a communication speed, the communication speed being lower than a communication speed of the first interface,
    - a communication path configured to connect the first interface and the second interface to exchange data,
    - a first-in first-out memory provided on the communication path,
    - a third interface configured to transmit image information to the image storage unit at the communication speed of the first interface,
    - a specifying unit configured to specify, upon the first interface receiving the address, either one of the second interface and the third interface as a transmission destination of the image information received by the first interface based on the address, and
    - a transmitting unit configured to transmit, when the second interface is specified as the transmission destination, the image information to the second interface through the communication path and the first-in first-out memory and transmits, when the third interface is specified as the transmission destination, the image information to the third interface.

11. The image processing device according to claim 10, wherein
- the transmitting unit is configured to transmit an address indicating an output destination of the image information, and
- the image processing controller further includes an address converting unit configured to convert the address transmitted from the transmitting unit through the communication path into an address on an address space used by the second interface.

12. The image processing device according to claim 10, wherein,
- the first interface receives the image information in units of a transmittable data amount from the image processing engine, and
- the first-in first-out memory has a storage capacity for storing the image information in units of the data amount.

13. The image processing device according to claim 12, wherein
- the second interface is configured to receive image information from the image processing unit and transmit the received image information through the communication path to the first interface,
- the first interface is configured to transmit the image information received through the communication path and the first-in first-out memory to the image processing engine,
- the image processing controller further includes an instructing unit that is arranged on a side of the first interface, and
- the instructing unit is configured to instruct the second interface to store the image information received through the communication path by the second interface in the first-in first-out memory, and then instruct the second interface to transmit the image information in units of data amount required for a single image processing by the image processing engine to the first-in first-out memory.

14. The image processing device of claim 10, wherein
the first interface is a PCIe bus module, and
the second interface is a PCI bus module.

15. The image processing device of claim 14, wherein
the second interface is configured to directly communicate with an external device.

16. The image processing device of claim 14, wherein the first interface is configured to communicate directly with the second interface through the communication path, the communication path including the first-in first-out memory and an address converting unit coupled to the first-in first-out memory.

17. The image processing controller of claim 16, wherein the communication path is switchless.

* * * * *